United States Patent [19]
Hotea

[11] Patent Number: 5,317,662
[45] Date of Patent: May 31, 1994

[54] OPTICAL STAR COUPLER ASSEMBLY

[75] Inventor: Gheorghe Hotea, Griesheim, Fed. Rep. of Germany

[73] Assignee: The Whitaker Corporation, Wilmington, Del.

[21] Appl. No.: 28,029

[22] Filed: Mar. 8, 1993

[30] Foreign Application Priority Data

Mar. 26, 1992 [GB] United Kingdom ............... 9206574

[51] Int. Cl.$^5$ .......................................... G02B 6/28
[52] U.S. Cl. ...................................... 385/46; 385/47
[58] Field of Search ............................ 385/39, 46, 47

[56] References Cited

U.S. PATENT DOCUMENTS

| 4,943,136 | 7/1990 | Popoff ................................ 385/46 |
| 5,208,885 | 5/1993 | Dragone et al. ................... 385/46 X |

FOREIGN PATENT DOCUMENTS

| 0131450 | 1/1985 | European Pat. Off. . |
| 0349207 | 1/1990 | European Pat. Off. . |
| 505710A1 | 12/1992 | European Pat. Off. . |
| 8716726.3 | 3/1988 | Fed. Rep. of Germany . |
| 2058396 | 4/1981 | United Kingdom . |

*Primary Examiner*—Akm E. Ullah
*Attorney, Agent, or Firm*—Eric J. Groen; Timothy J. Aberle

[57] ABSTRACT

A star coupler assembly includes an optical star coupler from which extend optical cables and a housing having a central grove accommodating the coupler. The optical cables are accommodated in a series of communicating groves of the housing and are held down therein by means of cable clips. The cables are led from the groves, between posts so that their end portions project through bores in side walls of the housing, whereby the end portions of the cables project from the housing side walls for connection to light transmitting or light sensitive devices at a site of use.

16 Claims, 14 Drawing Sheets

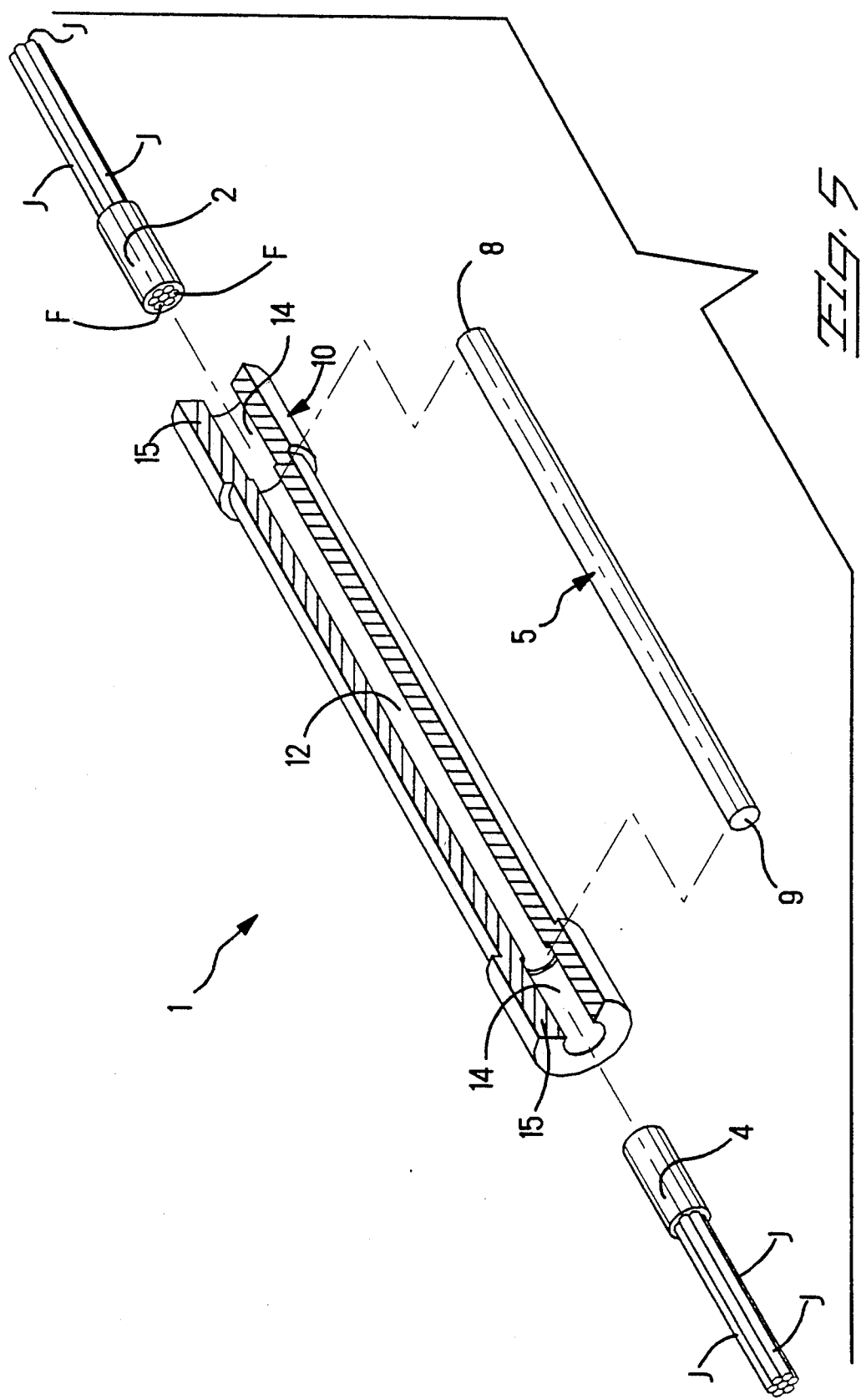

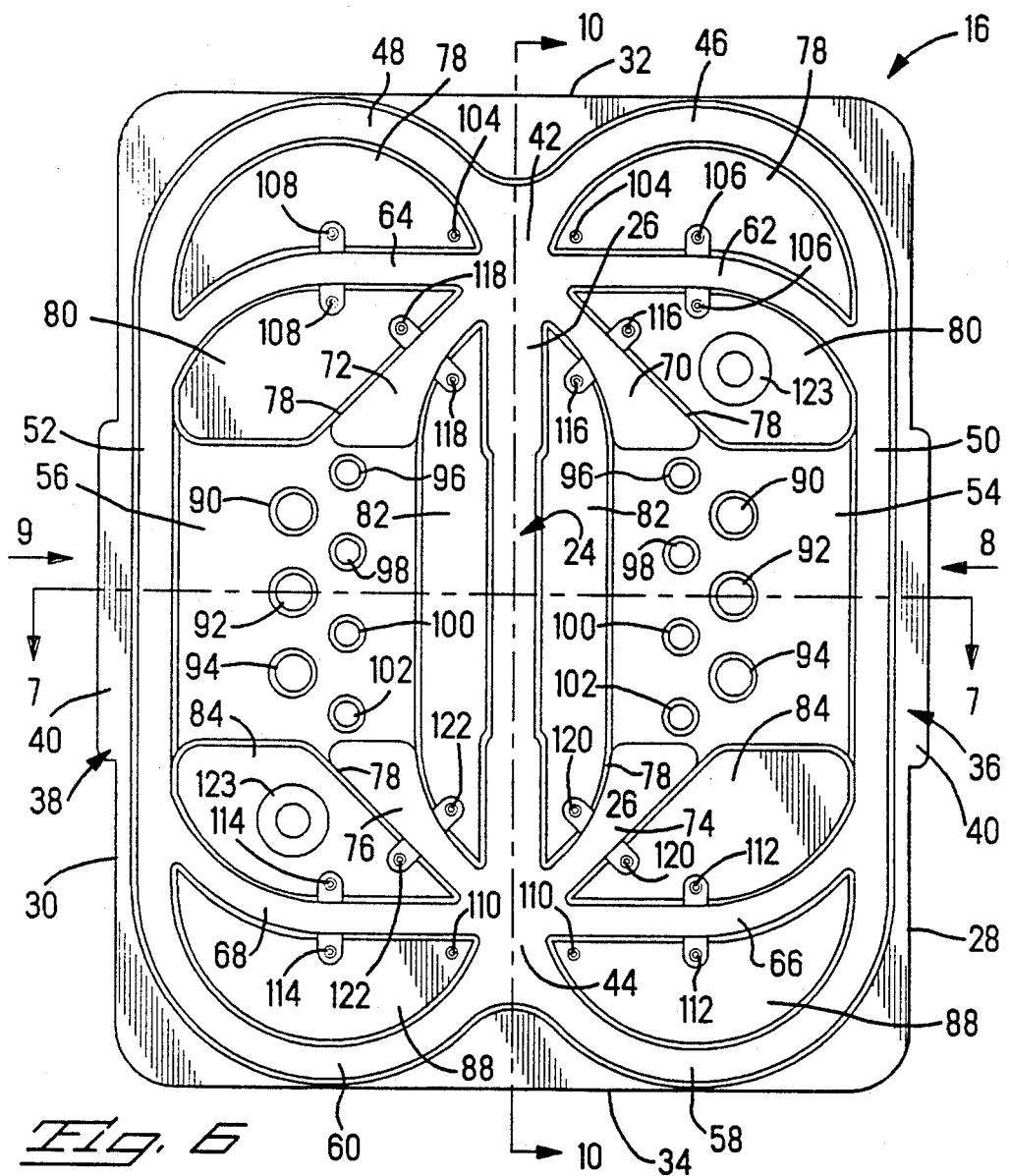
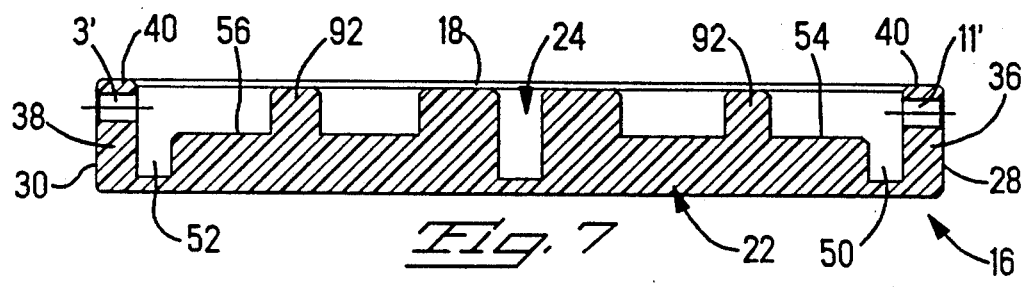

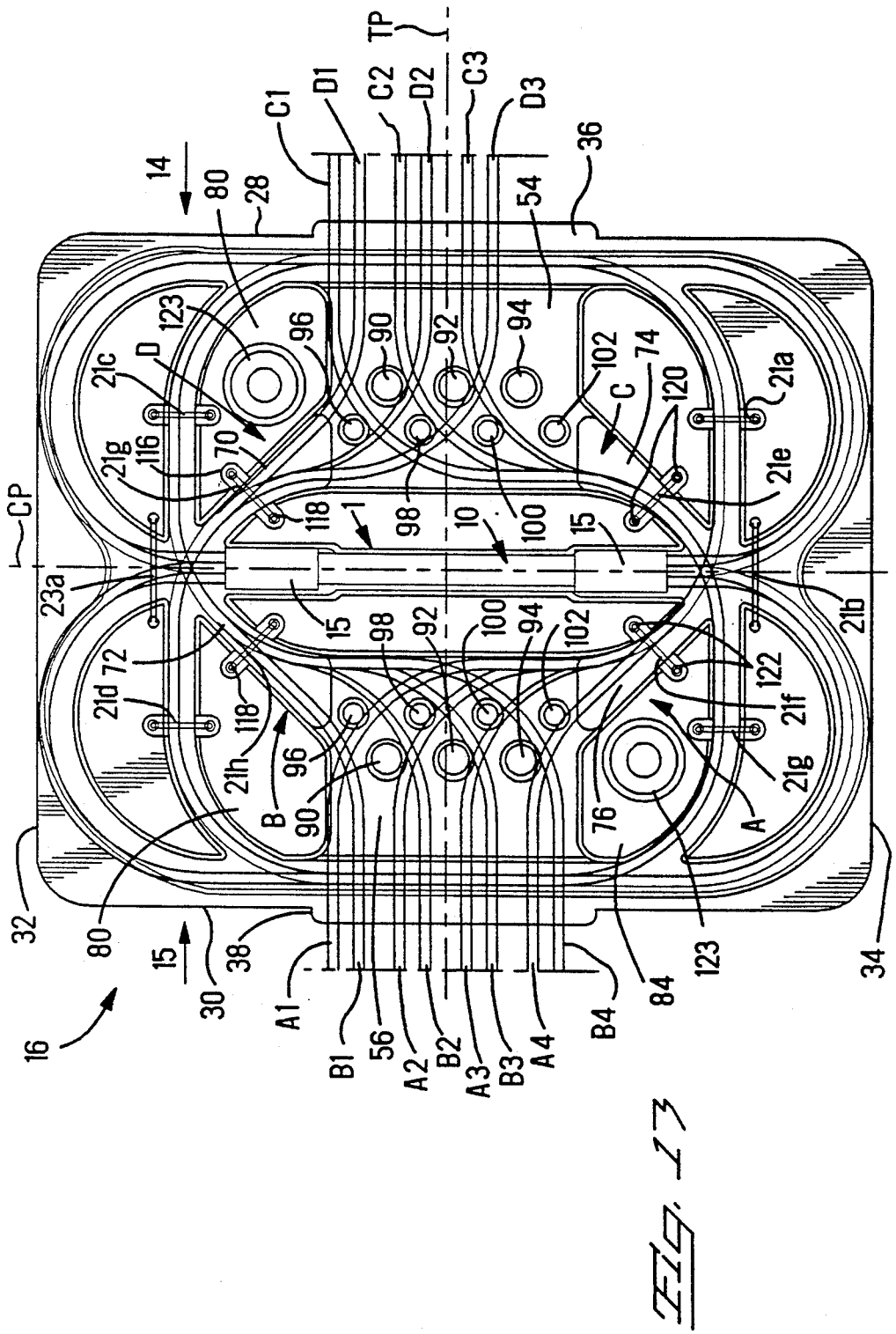

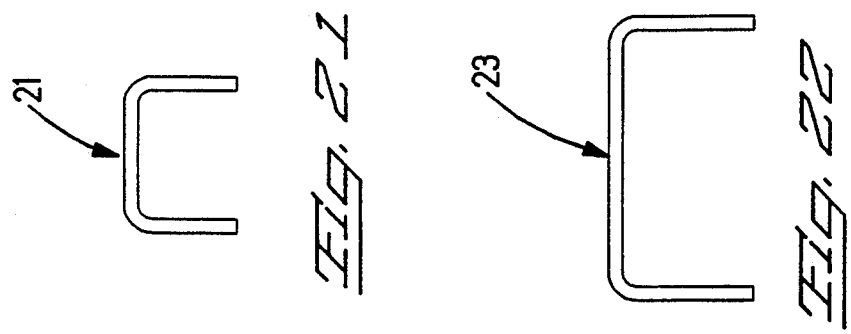
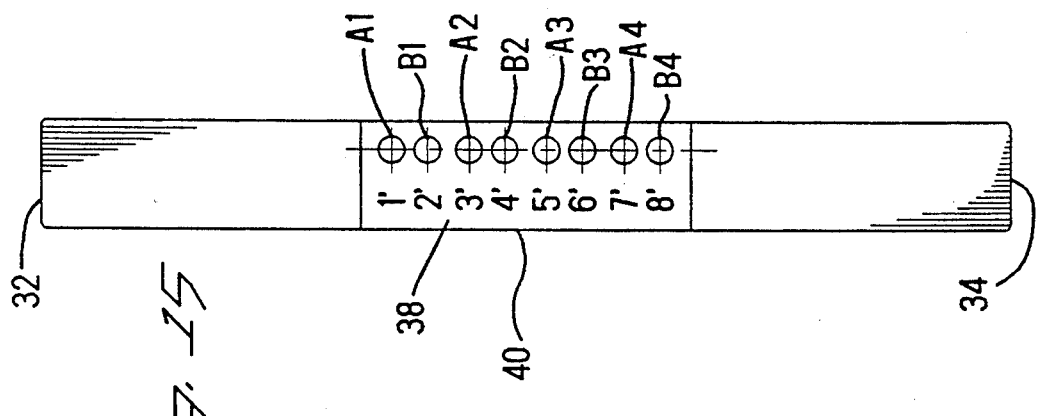
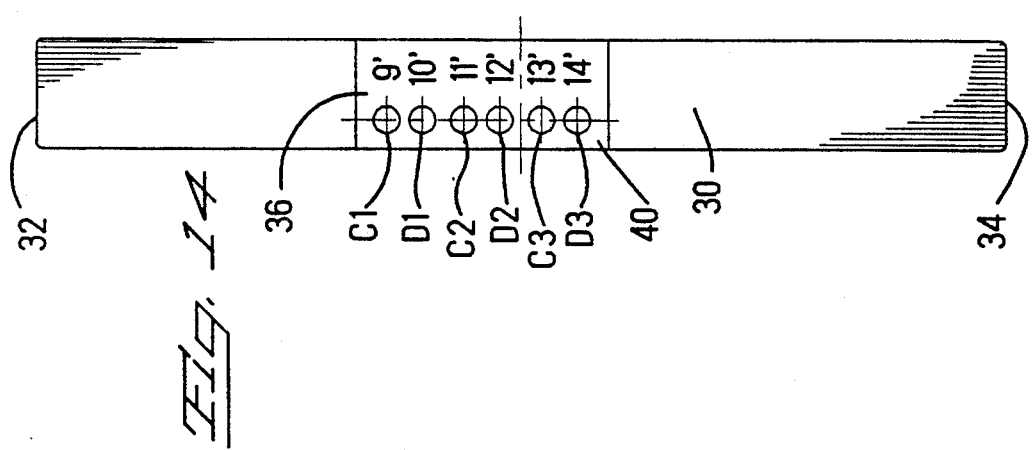

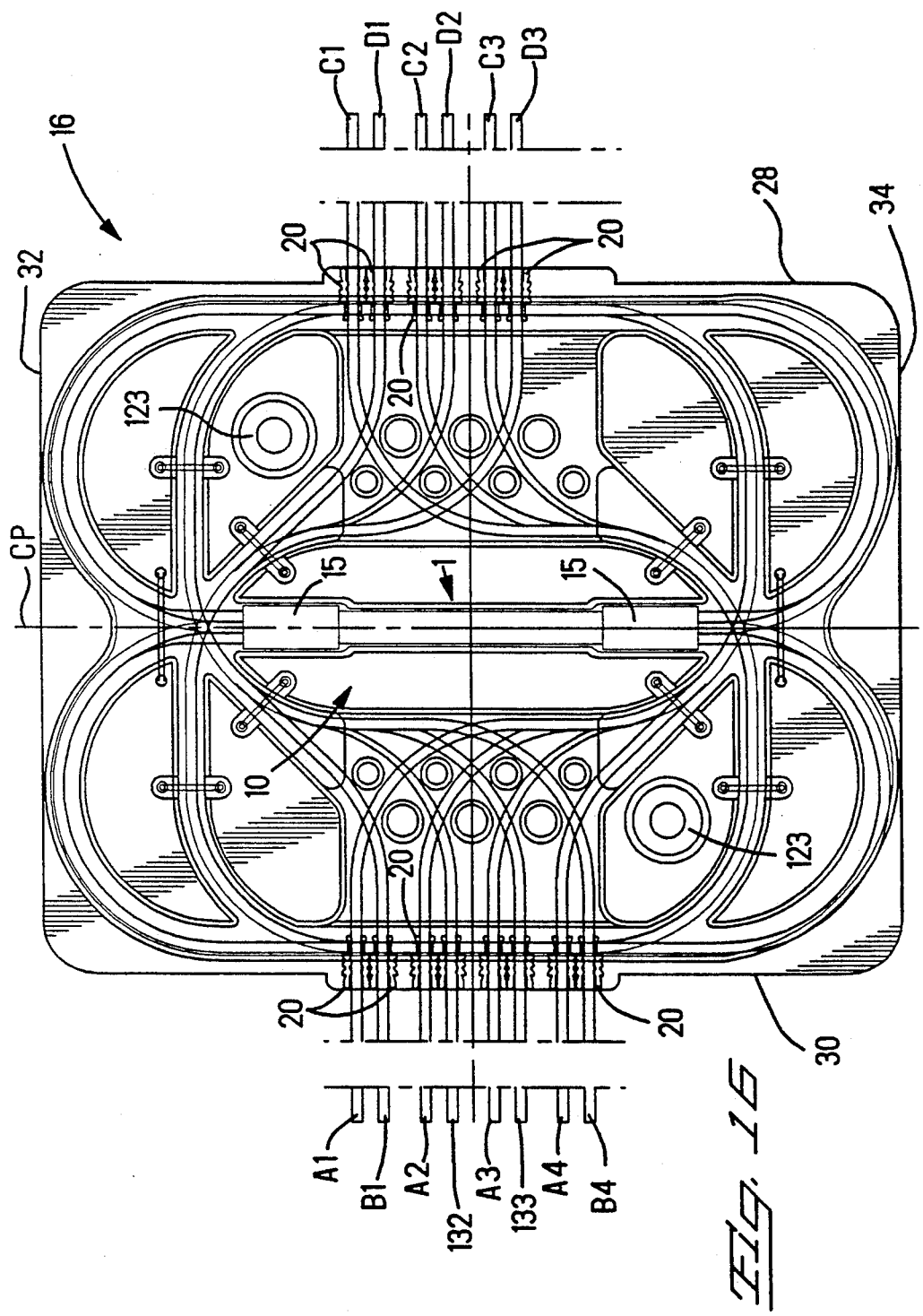

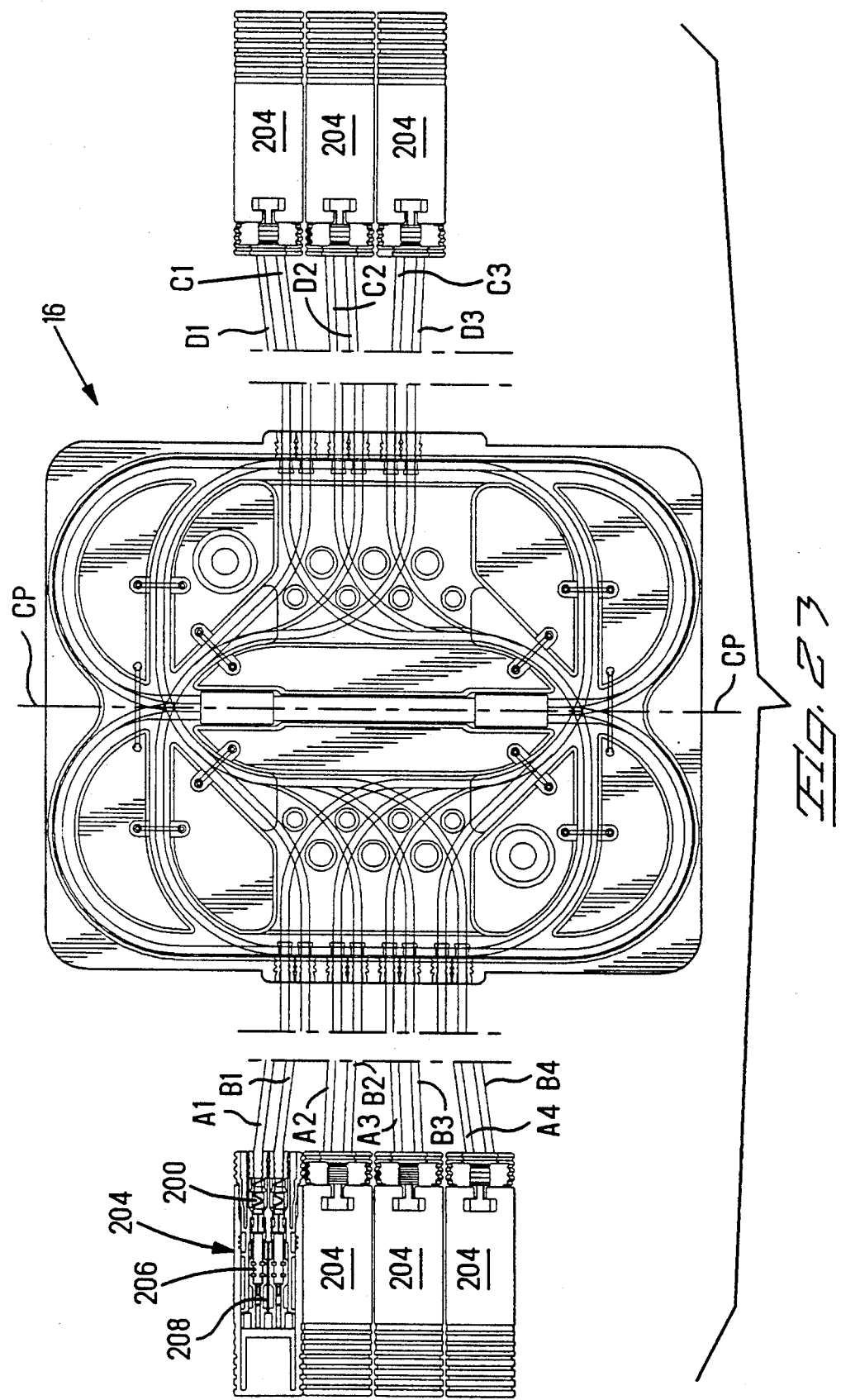

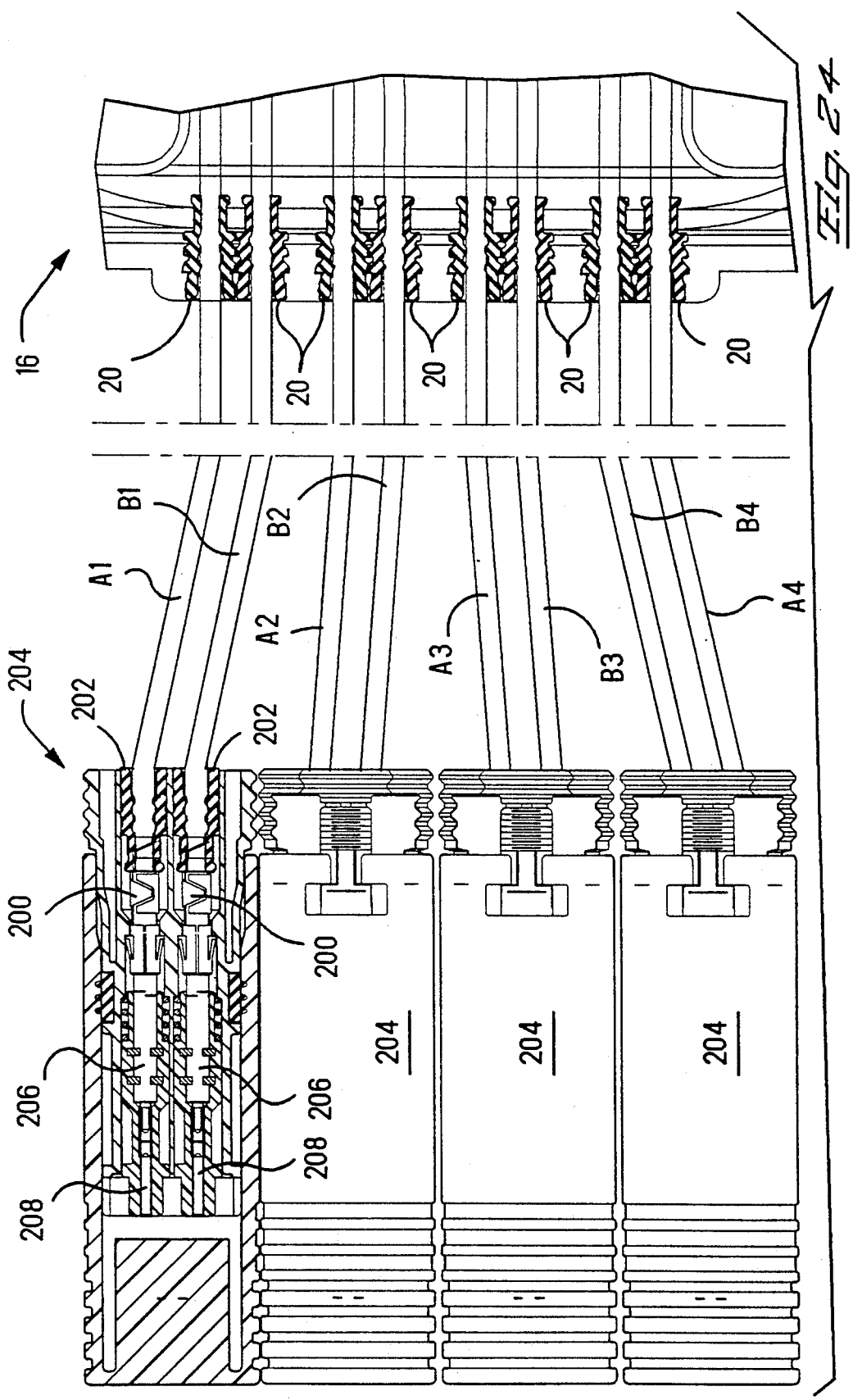

OPTICAL STAR COUPLER ASSEMBLY

BACKGROUND OF THE INVENTION

1. Field of the Invention

This invention relates to an assembly housing an optical star coupler. The invention also relates to a housing for the coupler. An optical star coupler is a device for transmitting light emitted by a selected optical cable of a first bundle of optical cables to each of the optical cables of a second bundle of optical cables.

2. Description of the Prior Art

Such star couplers are used, for example, in automotive vehicles, in optical instruments, for industrial automation, or for monitoring sensors in a machine, where it is required that a single light signal be transmitted to a plurality of light sensitive devices. Such a star coupler comprises an optical mixing rod having a bundle of optical cables optically and mechanically connected to each end of the mixing rod. Lengths of the cables extend from the bundles for connection to light emitting or light sensitive devices, as the case may be. Where an optical star coupler is being transported to its site of use, for example on the motor vehicle assembly line, there is a risk that the cables extending from the bundles may tangle, or become kinked, with a resulting loss of light when the coupler is in use.

SUMMARY OF THE INVENTION

The invention is intended to provide an optical star coupler assembly housing an optical star coupler so as to provide a compact unit that will enable the star coupler to be transported to its intended site of use with end portions of the cable lengths extending from the bundles, arranged in an orderly array for connection to respective light emitting and light sensitive devices.

According to one aspect of the present invention, an assembly housing an optical star coupler comprising an optical mixing rod having a bundle of optical cables optically and mechanically connected to each end thereof, lengths of said cables extending from said bundles, is characterised by a housing having a base and external walls upstanding from the base and being formed with through bores, the mixing rod being secured to the base and the cable lengths extending from said bundles also being secured to the base, with end portions of said cable lengths projecting through said respective ones of said bores and outwardly of said walls for connection to respective optical devices.

The base is preferably provided with grooves for accommodating the mixing rod and the cable lengths extending from the bundles of optical cables, the grooves for accommodating the cable lengths, being arranged to ensure that a maximum of cable lengths can be accommodated in a minimum space. The bores are preferably arranged on opposite external side walls of the housing in rectilinear rows, the cable lengths being divided into four groups, with the end portions of the cable lengths of one pair of these groups extending through the bores in one of the side walls and the end portions of the cable lengths of the other pair of groups extending through the bores in the other side wall. Preferably, the cable lengths of one group of each pair are crossed over the cable lengths of the other group of the pair, the end portions of the cable lengths of the groups of each pair extending through alternate bores of the row of bores in the respective side wall. The cable lengths are preferably guided with respect to the bores by means of posts projecting from the base and which may be arranged in a plurality of rows. The cable lengths may be secured to the base by means of cable clips inserted into receptacles in the base. The mixing rod may be secured in its groove by means of a pair of such clips securing the cable lengths to the base proximate to opposite ends of the mixing rod.

The mixing rod may be accommodated in a further housing which is received by the groove receiving the mixing rod. According to another aspect thereof the invention consists in a housing as claimed in claim 12.

BRIEF DESCRIPTION OF THE DRAWINGS

FIG. 5 is an exploded isometric view of a practical example of the conventional coupler illustrating schematically in FIGS. 1 to 4;

FIG. 6 is a top plan view of a moulded plastics housing for a seven fibre-to-seven fibre optical star coupler assembly according to the present invention, incorporating the coupler shown in FIG. 5;

FIG. 7 is a view taken on the lines 7—7 of FIG. 6 and showing a cover on the housing;

FIGS. 11 to 13 are top plan views of the housing illustrating successive steps in the assembly of the optical star coupler to the housing;

FIG. 14 is a side view taken in the direction of the arrow 14 in FIG. 13;

FIG. 15 is a side view taken in the direction of the arrow 15 in FIG. 13;

FIG. 16 is a plan view of the assembly without the cover, and showing sealing grommets assembled thereto;

FIG. 21 is a side view of a first form of optical cable clip for the assembly;

FIG. 22 is a similar view to that of FIG. 21 but showing a second form of optical cable clip.

FIG. 23 is a plan view shown partly in section of the coupler assembly when connected to external optical devices at its site of use; and FIG. 24 is an enlarged view illustrating details of FIG. 23.

DETAILED DESCRIPTION OF THE PREFERRED EMBODIMENT

Figure 1:
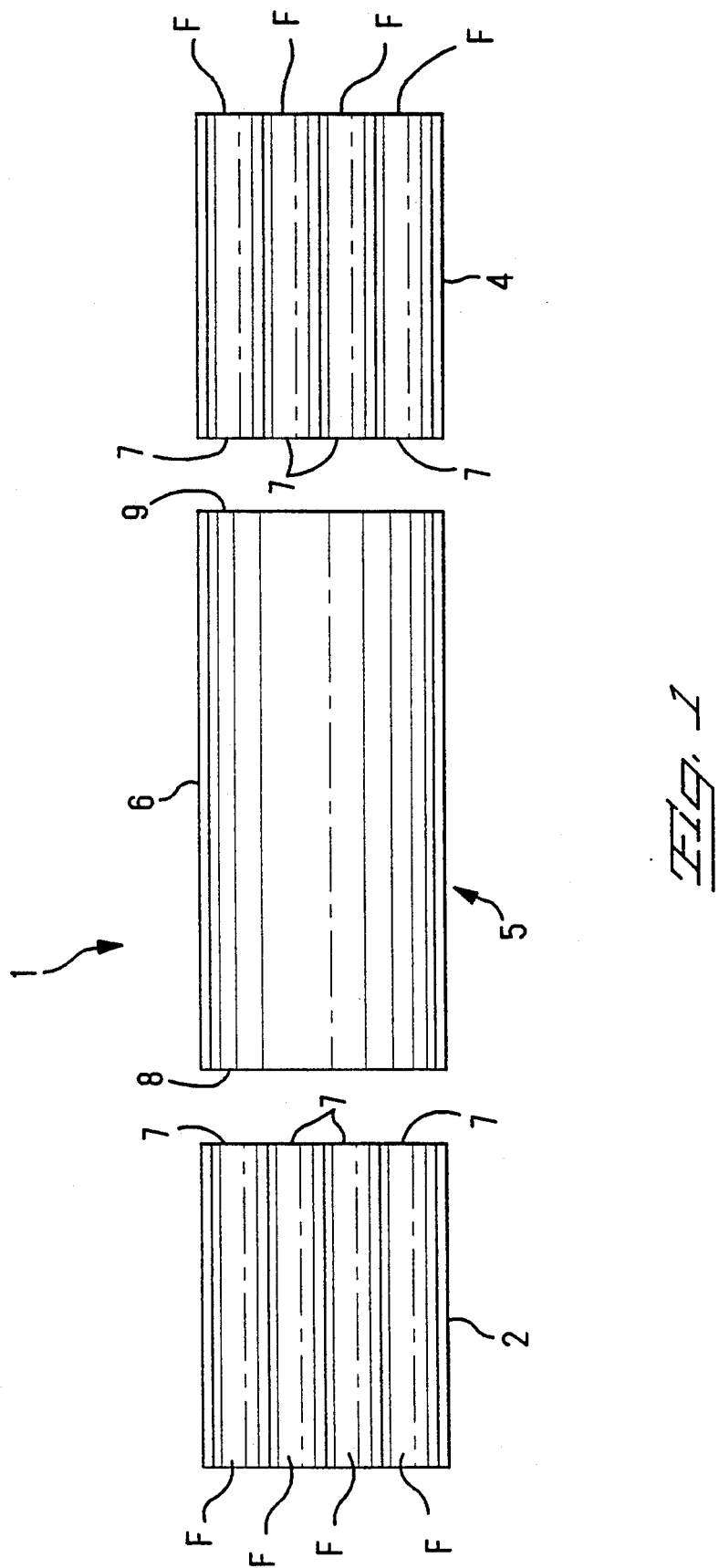
FIG. 1 is a schematic side view of a conventional optical star coupler comprising a pair of optical fibre connectors each receiving a bundle of optical cables, and an optical mixing rod.

A conventional optical star coupler 1 will now be described from a theoretical point of view with reference to FIGS. 1 to 4. The coupler 1 comprises a pair of optical fibre connectors 2 and 4 respectively, each receiving, and mechanically confining, a bundle of optical fibres F, and a rectilinear optical mixing rod 5 provided with cladding 6. The polished optical ends 7 of the fibres of each bundle butt against, at optical interfaces, and are connected to, the respective flat optical end faces 8 and 9 of the mixing rod 5. Each connector 2 and 4 is in the form of a tubular ferrule. When a selected fibre F in the connector 4 is light emissive as indicated by the hatching in FIG. 2, the light from the selected fibre is guided by the optical mixing rod 5 so as to illuminate the ends of all of the fibres in the connector 2 as indicated by the hatching in FIG. 3. Alternatively, a selected fibre in the connector 2 could be made emissive so as to illuminate the ends 7 of all the fibres in the connector 4. Such a star coupler is used for example in an optical control system, for example in a motor vehicle, an optical instrument, for industrial automation or for monitoring sensors in a machine, in which applications, it is required that a single light signal be transmitted to a plurality of light sensitive devices.

As shown in FIG. 5, in a practical example of the conventional optical star coupler, the connectors 2 and 4 with bundles of fibres F received therein are accommodated in a housing 10 having a central bore 12 receiving the mixing rod 5, each of the connectors 2 and 4 being snugly received in a respective enlarged end portion 14 of the bore 12, which portion extends through an enlarged end portion 15 of the housing 10. In practice, for protective purposes, the fibres extending rearwardly from the connectors 2 and 4, will be in the form of optical cables C provided with jackets J over their cladding. Although the star coupler described above, is a seven fibre-to- seven fibre star coupler, such couplers may comprise as many as thirty two or more, or less than seven, fibres in each bundle.

A seven fibre-to-seven fibre optical star coupler assembly according to an embodiment of the present invention will now be described with reference to FIGS. 6 to 22. The assembly is intended to provide a compact and sealed environment for the star coupler 1 that will enable it to be transported to its intended site of use and connected to respective light emitting and light sensitive devices there, without the danger of the optical cables extending externally of the coupler 1, becoming tangled or kinked.

The assembly according to said embodiment comprises the star coupler 1, a one piece, moulded plastic housing 16, a cover 18 (FIG. 7) for the housing 16, sealing grommets 20 (FIGS. 16 and 18 to 20), and optical cable clips 21 and 23 (FIGS. 21 and 22).

The housing 16 will now be described with particular reference to FIGS. 6 to 10. The housing 16 is in the form of a substantially rectangular, flat, block having a base 22, and defining an upwardly open central longitudinal groove 24 for receiving the coupler 1. The groove 24 has enlarged end portions 26 for accommodating the enlarged end portions 15 of the coupler housing 10. The groove 24 is bisected by the central longitudinal plain CP (FIGS. 11 to 13 and 16) of the housing 16. The housing 16 has opposed external side walls 28 and 30, respectively, and opposed external end walls 32 and 34, respectively. The side wall 28 has a laterally projecting, thickened, longitudinally central portion 36, the side wall 30 having a laterally projecting, thickened longitudinally central portion 38. The portion 38 has formed therein a row of eight parallel, spaced, through bores, referenced 1' to 8', respectively, extending parallel to the end walls 32 and 34. The portion 36 has formed therein, a row of six parallel, spaced, through bores, referenced 9' to 14' respectively, also extending parallel to the walls 32 and 34. The bores, which are located nearest to the upper surfaces 40 of the respective portions 36 and 38, are each dimensioned to receive one of the grommets 20 and a respective optical cable C extending through the grommet. The groove 24 communicates at one end thereof, with an upwardly open recess 42, the other end of the groove 24 communicating with upwardly open recess 44. Two arcuate, upwardly open grooves 46 and 48, on opposite sides of the plane CP, both of which are proximate to, and are bowed towards, the end wall 32 each open at their inner ends into the recess 42. The outer ends of the grooves 46 and 48 open into rectilinear, upwardly open lateral longitudinal grooves 50 and 52 respectively, extending parallel to, and proximate to, the side walls 28 and 30 respectively on opposite sides of the plane CP. The grooves 50 and 52 extend slightly below respective longitudinally central floors 54 and 56, respectively, of the housing 16, on opposite sides of the plane CP, as best seen in FIG. 7. At their ends remote from the respective arcuate grooves 46 and 48, the grooves 50 and 52 open into respective second upwardly open arcuate grooves 58 and 60, on opposite sides of the plane CP, each of which is proximate to, and is bowed towards, the end wall 34. At their ends remote from the respective grooves 50 and 52, the grooves 58 and 60 open into the recess 44. There also open into the recess 42, two transverse, upwardly open, opposed grooves 62 and 64, respectively, which open at their ends remote from the recess 42, into the grooves 50 and 52, respectively. Two further, upwardly open, opposed, transverse grooves 66 and 68, respectively, each open at one end into the recess 44. The other ends of the grooves 66 and 68 open into the grooves 50 and 52, respectively. There extend obliquely from the floors 54 and 56 upwardly open pairs of grooves 70 and 72, and 74 and 76, respectively. The bases of these grooves are raised slightly above the respective floors and each of these grooves have a flared mouth 78 opening towards one end of the respective floor 54 or 56 as the case may be. Each groove 70 and 72 opens at its end remote from the respective floor, into the recess 42. Each groove 74 and 76 opens into the recess 44, at its end remote from the respective floor.

The grooves, the floors, and the recesses mentioned above are defined by appropriately shaped lands 78, 80, 82, 84, 86 and 88, up standing from the base 22, and are all for receiving optical cables extending from the star coupler 1.

Figure 2:
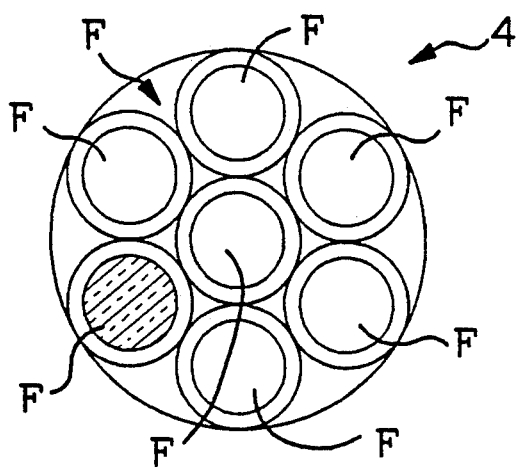
FIGS. 2 and 3 are front end views of respective ones of the connector illustrating an aspect of the operation of the coupler.
Figure 3:
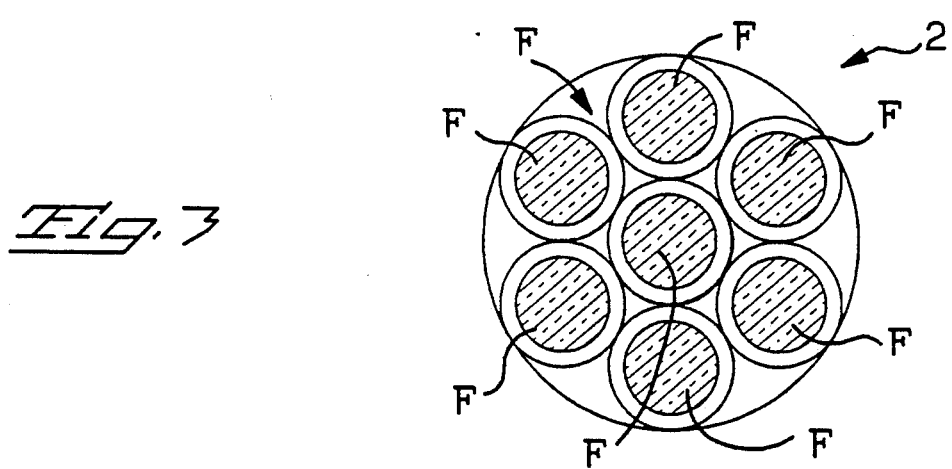
Figure 4:
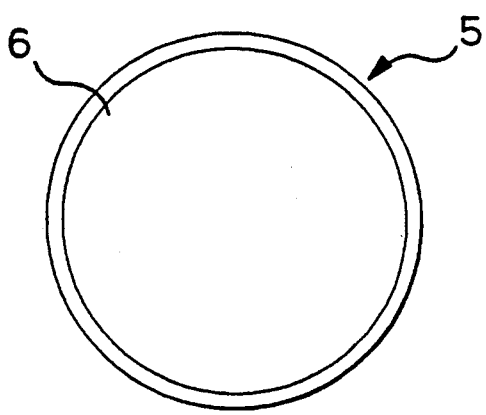
FIG. 4 is an end view of the optical mixing rod.
Figure 10:
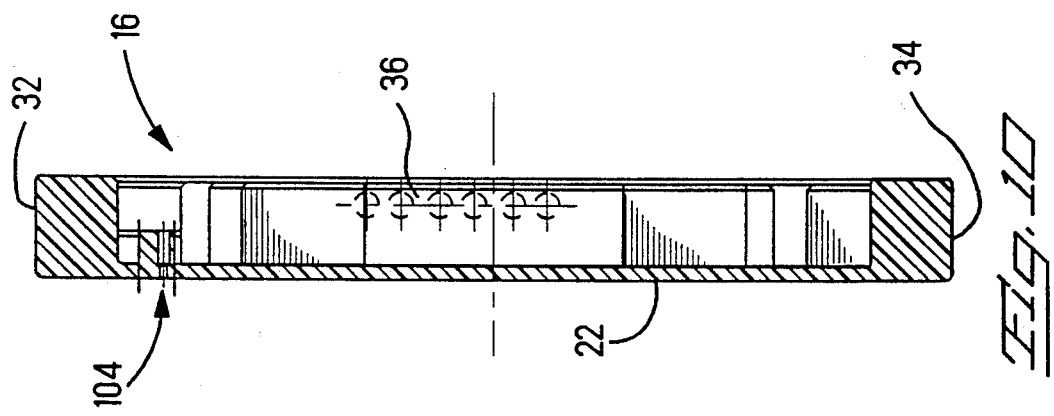
FIG. 10 is a view taken on the lines 10—10 in FIG. 6.
Figure 9:
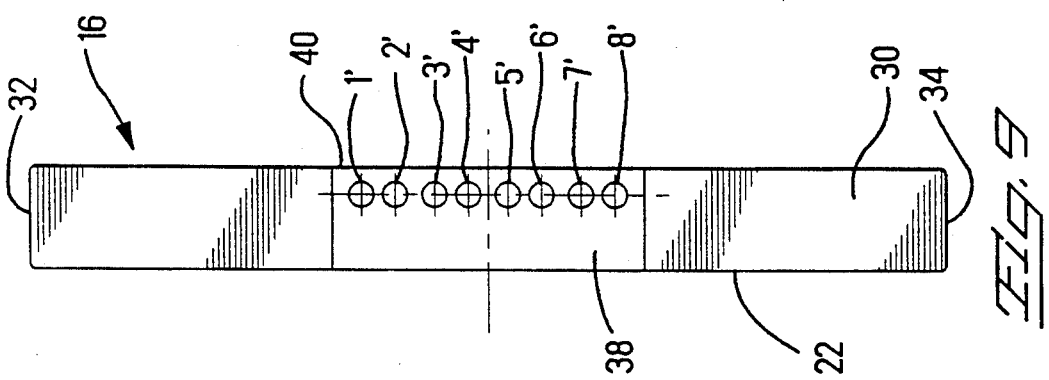
FIG. 9 is a view taken in the direction of the arrow 9 in FIG. 6.
Figure 8:
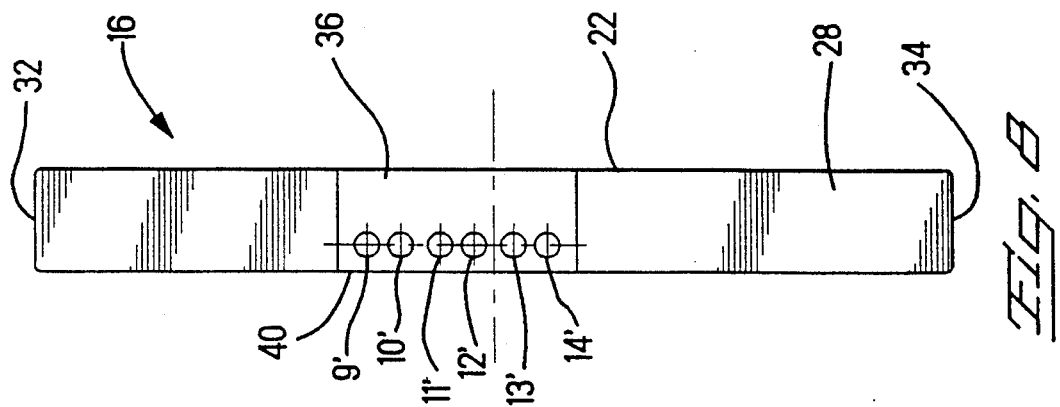
FIG. 8 is a view taken in the direction of the arrow 8 in FIG. 6.

There upstands from each floor 54 and 56, a row of three constantly spaced, circular cross section, optical cable outer guide posts 90, 92 and 94, respectively, and a row of four constantly spaced, circular cross section, optical cable inner guide posts 96, 98, 100 and 102, respectively, the outer posts 90, 92, and 94 being of larger cross section than the inner posts and all of the posts being of the same height as said lands. The side walls and the end walls of the housing 16 are slightly higher than the lands and posts in order to accommodate the cover 18, as shown in FIG. 7. The lands 78 have proximate to the recess 42, opposed optical cable clip receptacles 104. The lands 78 and 80, have located in recesses therein on each side of the groove 62, opposed optical cable clip receptacles 106, the lands 78 and 80 on each side of the groove 64 having located in recesses therein, opposed optical cable clip receptacles 108. Analogously, the lands 88 have opposed optical cable clamp receptacles 112, and the lands 84 and 88 on each side of the groove 66 have opposed optical cable clip receptacles 112, the lands 84 and 88 on each side of the groove 68 having opposed optical cable clip receptacles 114. The lands 80 and 82 on each side of the groove 70, have provided in recesses in these lands, opposed optical cable clip receptacles 116, the lands 80 and 82 on each side of the groove 72 having, provided in recesses therein, optical cable clip receptacles 118. Analogously, the lands 82 and 84 on each side of the groove 76, have provided in recesses therein, optical cable clip receptacles 120, the lands 82 and 84 each side of the groove 76 having similar optical cable receptacles 122. The receptacles of all of the opposed pairs of the receptacles mentioned above, excepting the pairs 104 and 110, are spaced equally from each other to receive the legs of a respective U-shaped, optical cable clip 21 (FIG. 2 1). The receptacles 104 and 110 of each pair are spaced from each other to receive the legs of a somewhat larger U-shaped optical cable clip 23 (FIG. 22). The clips 21 and 23 are made by bending wire. The land 80 bounding the groove 70 and the land 84 bounding the groove 76 are each formed with a counter sunk socket 123, lined with a sealing material, for receiving a fastener for securing the housing 16 to a support (not shown) and for securing the cover 80 of the housing 16. The features described above of the housing 16, are arranged symmetrically with respect to the central longitudinal plain CP and symmetrically with respect to the central transverse plane TP (FIGS. 11 to 13 and 16), of the housing 16.

Figure 11:
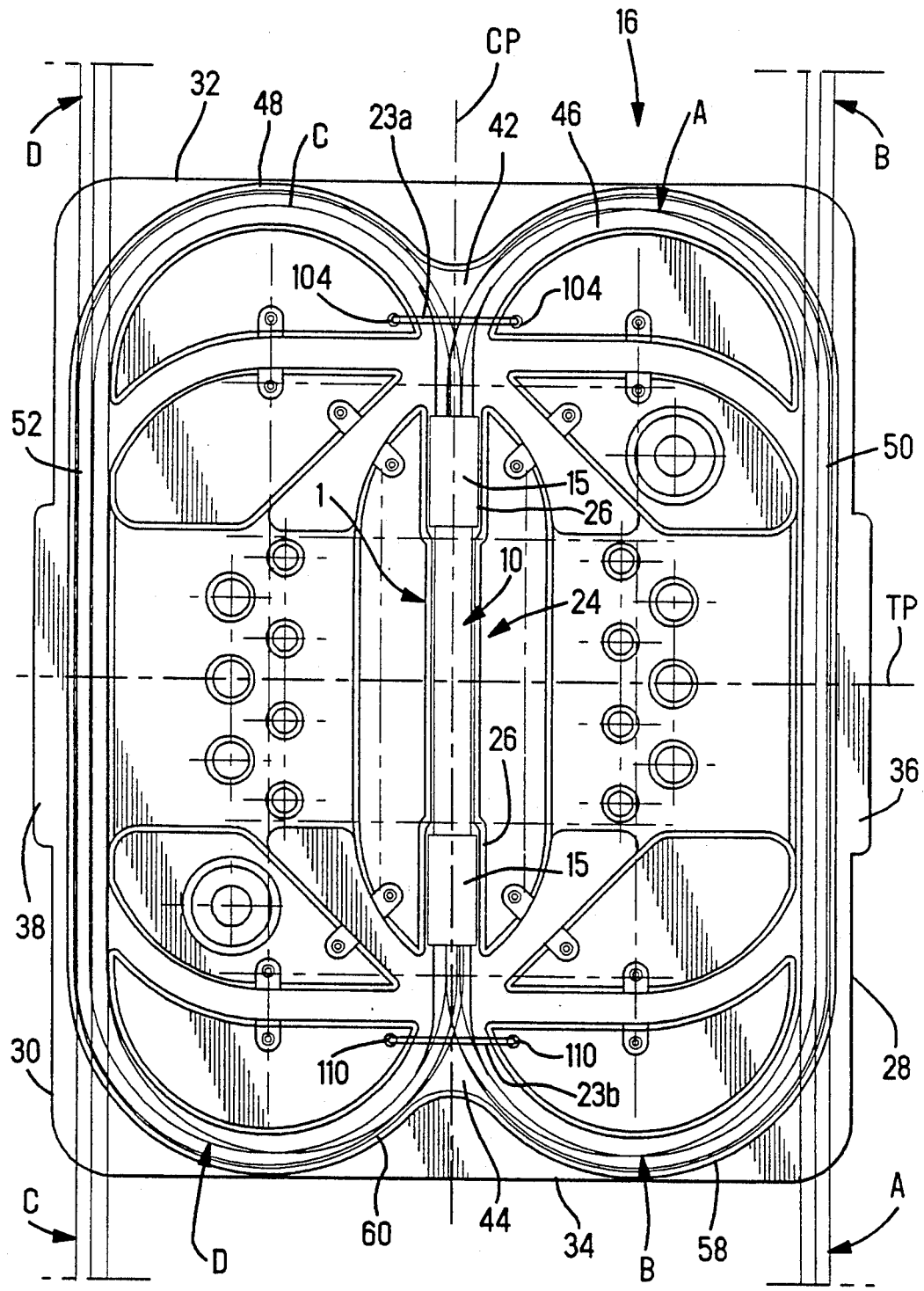

The assembly of the star coupler 1 to the housing 16 will now be described with particular reference to FIGS. 11 to 20. The housing 16 is brought to an assembly position with the side wall portion 36 on the right hand side and the side wall portion 38 on the left hand side as shown in FIG. 11 and the star coupler 1 is placed in the housing 16. The optical cables at one end of the coupler 1 are separated into two groups namely A and C, the group A consisting of four cables and the group C consisting of three cables. The cables at the opposite end of the coupler 1 are also separated into two groups namely B and D, the group B consisting of four cables and the group D of three cables. The cables of group A are located in the recess 42 and the groove 46, the cables of group B being located in the recess 44 and the groove 58. The cables of the group C are located in the recess 42 and the groove 48, and the cables of the group D are located in the recess 44 and in the groove 60. The coupler 1 is then placed in the groove 24 with the enlarged ends of its housing 10 in the portions 26 of the groove 24. The legs of a clip 23a are inserted into the receptacles 104 so that the clip 23a holds down the cable lengths in the recess 42 and the legs of a clip 23b are inserted into the receptacles 110 so that the clip 23b holds down the cable lengths in the recess 44. The coupler 1 is thereby held in position in the groove 24 as will be apparent from FIG. 11. The cable groups A and B are led in opposite directions along the groove 50 and are thereby crossed so as to extend beyond the end walls 34 and 32 respectively, and the cable groups C and D are led in opposite directions along the groove 52 and are thereby crossed to extend beyond the end walls 34 and 32, respectively; all as shown in FIG. 11.

Figure 12:
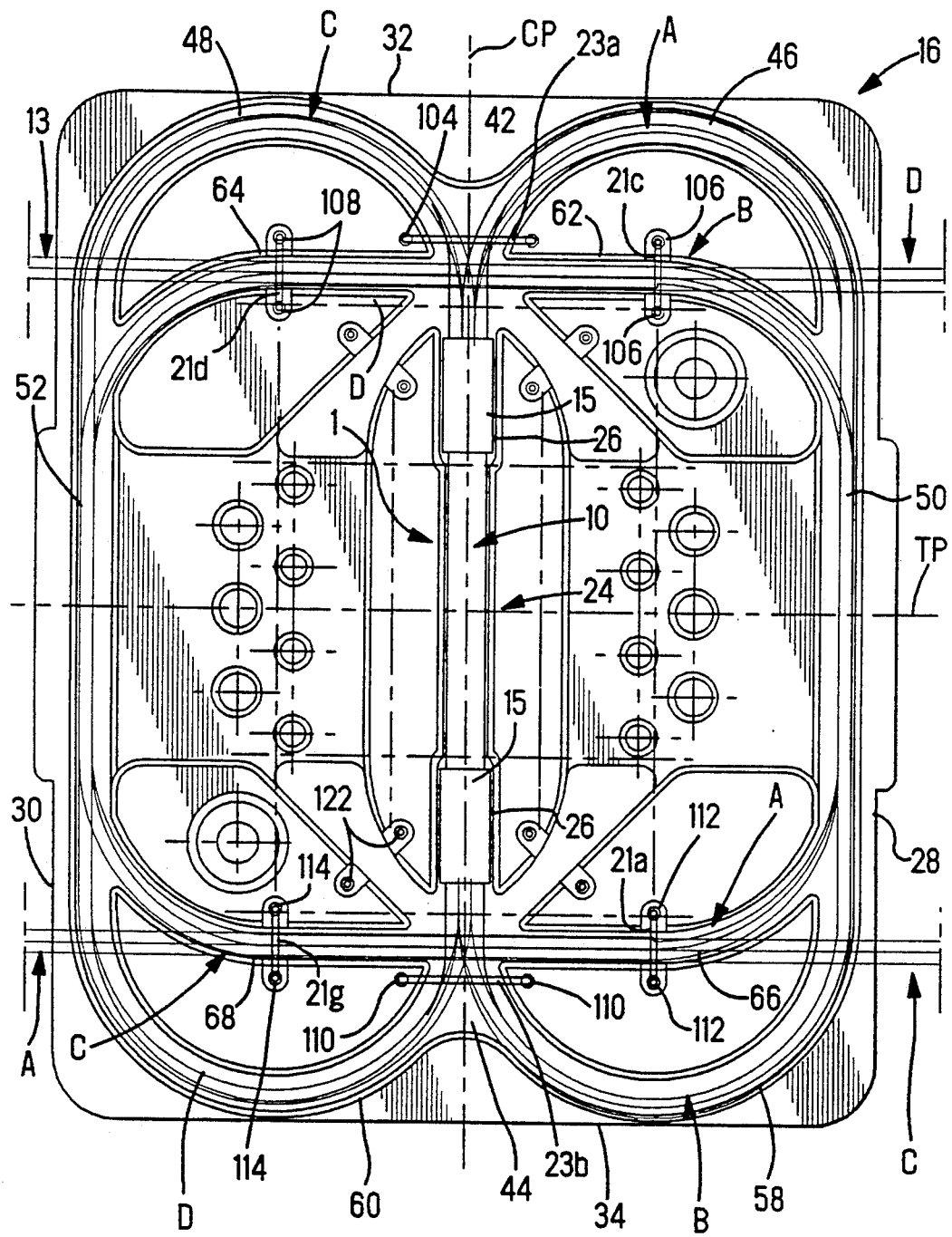

Reference will now be made to FIG. 12. The portion of the cable group A projecting from the groove 50 and beyond the end wall 34 (in FIG. 11) is bent round to cause the projecting part of the group A to extend through the groove 66 and beyond the side wall 30 of the housing 16, and is held in position in the groove 66 by inserting the legs of a clip 21a into the receptacles 112. The portion of the group C projecting from the groove 52 (in FIG. 11) and beyond the end wall 34 is bent round in the opposite direction to said portion of the group A so as to extend through a groove 68 and beyond the side wall 28 of the housing 16 and is held in place in the groove 68 by inserting the legs of a clip 21b into the receptacles 114. The said portions of the groups A and C are thereby crossed.

The portion of the group B which projects from the groove 50 (in FIG. 11) and beyond the end wall 32 of the housing 16 is bent round to extend through the groove 62 and to project beyond the side wall 30 of the housing 16 and is held in place in the groove 62 by inserting the legs of a clip 21c into the receptacle 106. The portion of the group D which projects from the groove 52 (in FIG. 11) and beyond the end wall 32 is bent round in the opposite direction to said portion of the group B to extend through the groove 64 and to project beyond the side wall 28 of the housing 16 and is held in place in the groove 64 by inserting the legs of a clip 21d into the receptacle 108. The cable groups B and D are thereby crossed. The configuration of the optical cables is now as shown in FIG. 12.

Reference will now be made to FIGS. 13 to 15. The portion of the group C which projects from the groove 68 (in FIG. 12) and beyond the side wall 28 of the housing 16 is led through the groove 74 and across the floor 54, a cable C1 of the group C being threaded between the posts 90 and 96 and inserted through the bore 9', a cable C2 of the group C being threaded between the posts 92 and 98 and inserted through the bore 11', and a cable C3 of the group C being threaded between the posts 94 and 100 and inserted through the bore 13'. The legs of a clip 21e are then inserted into the receptacles 120 to hold the group C down in the groove 74. The portion of the group A which projects from the groove 66 (in FIG. 12) beyond the housing side wall 30 is led through the groove 76 and across the floor 56, a cable A1 of the group A being threaded between the posts 90 and 98 and inserted through the bore 1', a cable A2 of the group A being threaded between the posts 92 and 98 and inserted through the bore 3', a cable A3 of the group A being threaded between the posts 94 and 100 and inserted through the bore 5', and a cable A4 of the group A being threaded between the post 102 and the adjacent land 84 and inserted through the bore 7'. The legs of a clip 21f are then inserted into the receptacles 122 to hold the group A down in the groove 76.

The portion of the cable group D which projects from the groove 64 (in FIG. 12) and beyond the side wall 28 is led through the groove 70 and across the floor 54, a cable D1 of the group D being threaded between the post 96 and the adjacent land 80 and inserted through the bore 10', a cable D2 of the group D being threaded between the posts 90 and 98 and inserted through the bore 12', and a cable D3 of the group D being threaded between the posts 92 and 1 00 and inserted through the bore 14'. The legs of a clip 21g are inserted into the receptacles 116 to hold the group D down in the groove 70. The portion or the cable group B which projects from the groove 62 (in FIG. 12) and beyond the housing side wall 30 is led through the groove 72 and across the floor 56, a cable B1 of the group B being threaded between the post 96 and the adjacent land 80 and inserted through the bore 2', a cable B2 of the group B being threaded between the posts 90 and 98 and inserted through the bore 4', a cable B3 of the group B being threaded between the posts 92 and 100 and inserted through the bore 6', and a cable B4 of the group B being threaded between the posts 94 and 102 and inserted through the bore 8'. The legs of a clip 28h are inserted into the receptacles 118 to hold the group B down in the groove 72.

Care must be taken in carrying out the threading operations described above, to avoid kinking of any of the optical cables.

In the operations described above with reference to FIGS. 13 to 15, the cables of each group on each of the floors 54 and 56 are crossed over those of the other group on the same floor, whereby the cables of each group are inserted through alternately numbered bores so that end portions of the cables project outwardly from the side walls 28 and 30, as described above. In this embodiment, the cables of group D overlie those of group C on the floor 54 and the cables of group B overlie those of group A on the floor 56.

In order to seal the star coupler assembly, given that the cover 18 and the sockets 123 are provided with suitable sealing means, a corrugated sealing grommet is inserted into each of the bores 1' to 14', to provide a seal between the optical cable extending through the bore and the wall of the bore.

Figure 17:
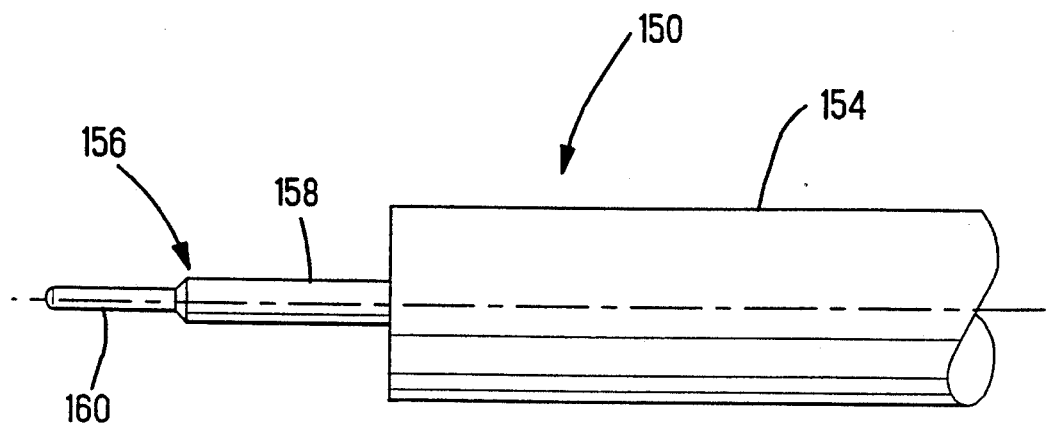
FIG. 17 is an enlarged side view of a first auxiliary tool for use in assembling the grommets to the housing.
Figure 18:
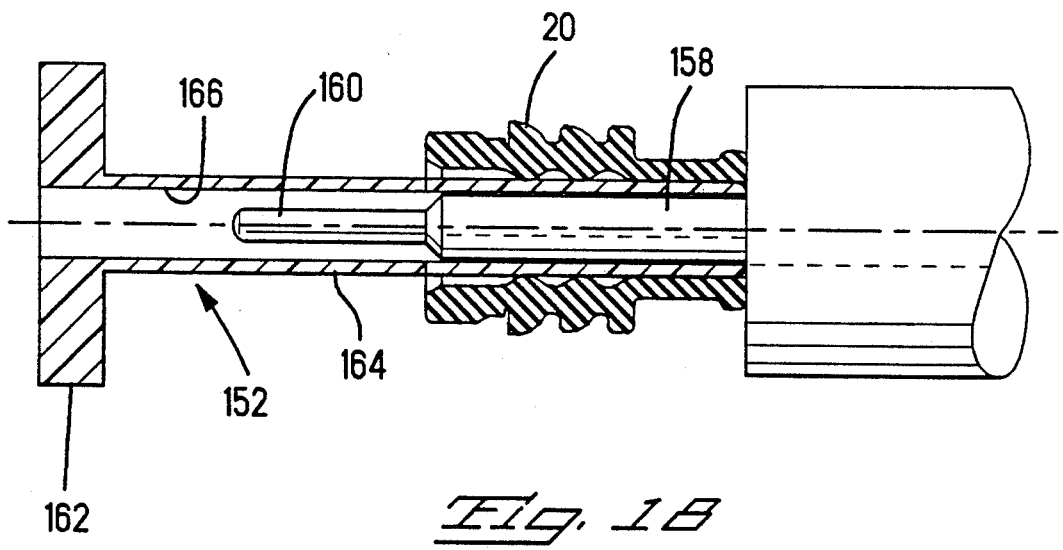
FIGS. 18 to 20 are side views shown partly in cross section, illustrating successive steps in the assembly of the grommets to the housing.
Figure 19:
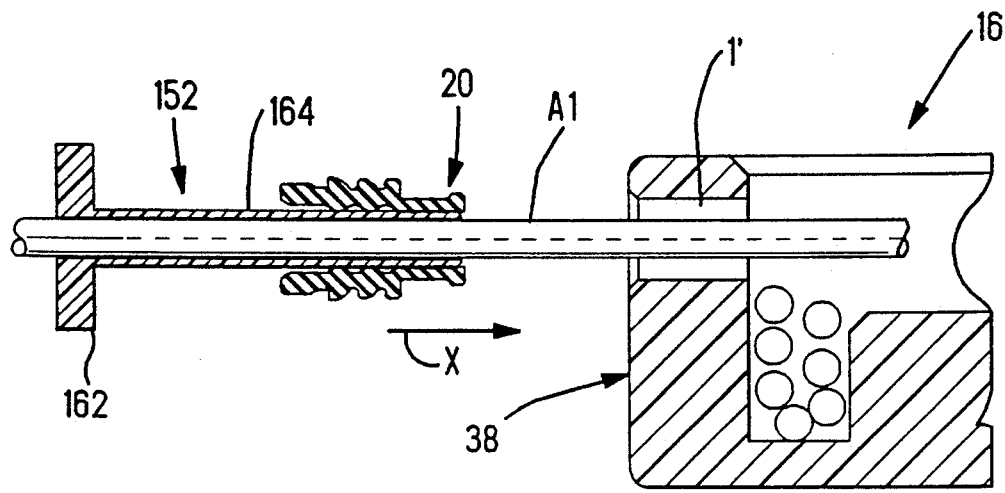
Figure 20:
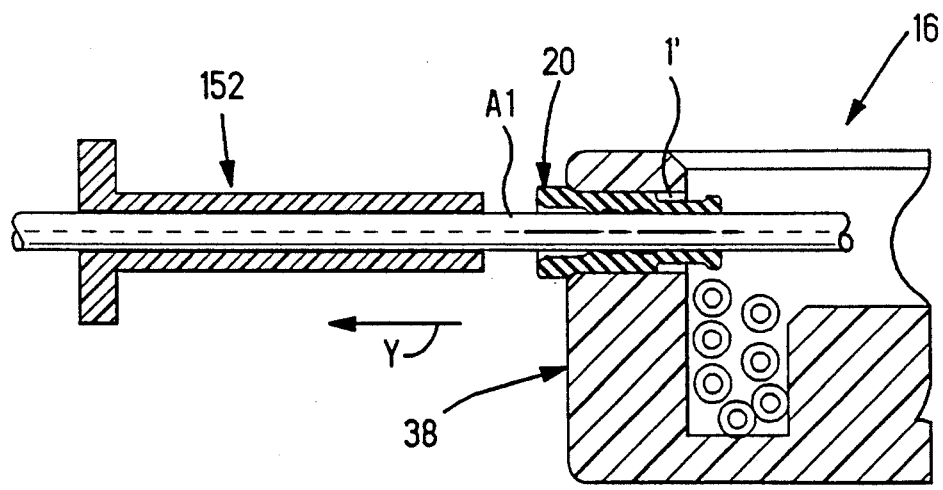

The insertion of the grommets 20 will now be described with reference to FIGS. 17 to 20. This operation is performed with the aid of auxiliary tools 150 and 152. Before carrying out the operation, the walls of the bores and the working parts of the auxiliary tools must first be lubricated. The tool 20 comprises a handle 154 from which projects a cylindrical spigot 156 having a larger cross section part 158 adjacent to the handle 154 and a smaller cross section guide part 160 projecting from the part 158, as best seen in FIG. 17. A grommet 20 is initially inserted over the spigot 156 so as to surround its larger cross section part 158. The auxiliary tool 152 comprises a handle 162 formed integrally with a tube 164 having a bore 166 for receiving the part 158 of the spigot 156. The tube 164 is open at both ends. As shown in FIG. 18, the tube 164 is inserted between the part 158 of the tool 150 and the grommet 120 thereon, guided by the part 160 of the tool 150. The grommet 20 is accordingly stretched radially so that it adheres to the tube 164. The tool 152 is then withdrawn from the tool 150 leaving the grommet 20 on the tube 164 as shown in FIG. 19. As shown by way of example in FIG. 19, the tube 164 is inserted over the free outer end of the cable Al and is then advanced in the direction of the arrow X in FIG. 12, until, as shown in FIG. 20, the grommet 20 is inserted into the bore 1', the serrations on the grommet 120 serving to grip the walls of the bore 1' so that the tool 152 can be withdrawn in the direction of the arrow Y leaving the grommet in the bore 1'. The serrations on the grommet 120 act as a series of peripheral seals arranged in series.

As will be apparent from FIG. 16, a grommet 20 is inserted into each of the bores 1' to 14', FIG. 16 showing these grommets in place. The cover 18 having been applied to the housing 16, the assembly can now be transported to its intended site of use, for example at a motor vehicle assembly line and the end portions of the optical cables projecting outwardly from opposite sides of the housing 16 connected to the relevant light emitting and light sensitive devices of a vehicle.

As shown in FIGS. 23 and 24, each of the cables may be terminated to a plug terminal 200 provided with a sealing grommet 202, for reception in a sealed housing 204 at the site of use to mate with a further terminal 206 connected to a light guide 208, which in turn communicates with a light emitting or a light sensitive optical device (not shown), as the case may be. Each housing 204 receives two plug terminals 200 and mating terminals 206 and contains two such optical devices; according to the teaching of German patent application N° P 41 41 009.2 which is hereby incorporated herein by reference.

The housing 16 could be modified to accommodate an optical star coupler having more than, or less than, fourteen optical cables, the size of housing and the numbers of cable guiding posts being reduced or augmented as the case may be. The groove 24 could be modified to accept a mixing rod which is other than rectilinear, the connectors for the fiber bundles being fixed to the ends of the mixing rod and the housing 10 being eliminated.

The optical cables within the housing 16 are long because they should not be bent through a radius which is less than 30 mm. The optical cables are crossed over each other in order to keep the dimensions of the housing 16 to a minimum and to arrange the output and input points of the cables in a logical order.

I claim:

1. An assembly housing an optical star coupler comprising an optical mixing rod having a bundle of optical cables optically and mechanically connected to each end thereof, lengths of said cables extending from said bundles;

characterized by a housing having a base and external walls upstanding from the base and being formed with through bores, the mixing rod being secured to the base and the cable lengths extending from said bundles also being secured to the base with end portions of said lengths projecting through respective ones of said bores and outwardly of said walls for connection to respective optical devices;

the mixing rod is received in a central groove in the base and is held down in the groove by means securing the portions of said cable lengths proximate to said bundles;

and wherein said cable lengths extend through further grooves in the base, communicating with the central groove at each end thereof, said lengths extending from said further grooves between cable guiding posts to said bores, said posts being disposed laterally of said central groove, said external walls upstanding on opposite sides of said central groove.

2. An assembly as claimed in claim 1, characterized in that the cable lengths extend between said posts in pairs of groups, the cable lengths of one group of each pair overlying the cable lengths of the other group of said pair so that the cable lengths of each group of said pair extend through alternate ones of the bores, in the respective external wall.

3. An assembly as claimed in claim 1, characterized in that one of the cable lengths extends through each bore, the number of bores in one of the external walls exceeding the number of bores in the other external wall by an even number.

4. An assembly as claimed in claim 1, characterized in that said external walls are longitudinal side walls of the housing connected by end walls thereof, the housing having a central longitudinal plane bisecting said end walls and a transverse central plane bisecting the side walls, said further grooves comprising a first pair of arcuate grooves and a second pair of arcuate grooves, the grooves of each pair of arcuate grooves being disposed on opposite sides of said central plane and the pairs of arcuate grooves being disposed on opposite sides of said transverse plane and being bowed away therefrom, one end of each arcuate groove of the first pair being connected to one end of a respective arcuate groove of the second pair, by way of a respective longitudinal groove, the other end of each arcuate groove of the first pair communicating with a recess in the base, said recess also communicating with said central groove at one end thereof, the other end of each arcuate groove of the second pair communicating with a further recess in the base said further recess also communicating with the other end of said central groove, each of said recesses being connected to a respective one of said longitudinal grooves by way of a transverse groove and each said recess further communicating with a respective floor in said base, by way of a respective oblique groove, said floors being arranged upon opposite sides of said central plane, an array of said cable guiding posts projecting from each floor, a portion of each external wall in which portion the bores of that wall are formed, being aligned with, and bounding, a respective one of said floors.

5. An assembly as claimed in claim 4, characterized in that the cable lengths extending from the bundle at one end of the mixing rod comprise a first group extending through the first arcuate groove on one side of the central plane, through the longitudinal groove connected thereto, through the transverse groove on the same side of the central plane and on the other side of the transverse plane, through the recess at said other end of the central groove, through the oblique groove on the said opposite side of the central plane and on the other side of the transverse plane and between respective posts of the floor on the said other side of the central plane, a second group of the cable lengths extending from the bundle at said one end of the mixing rod extending through the other arcuate groove of the first pair, through the longitudinal groove connected thereto, through the transverse groove on said other side of the central plane and on said other side of said transverse plane, through the recess at the other end of the central groove, through the transverse groove on said other side of the central plane and on said other side of said transverse plane, through the recess at the other end of the central groove, through the transverse groove on said one side of the central axis, across the floor on the same side of the central plane, a first group of the cable lengths extending from the bundle at the said other end of the mixing rod extending through the arcuate groove of the second pair, on the said one side of the central plane, through the longitudinal groove connected thereto, so as to cross over the cable lengths of the first group, through the transverse groove on said one side of the central plane and on said one side of the transverse plane, through the recess at said one end of the mixing rod, through the oblique groove on said other side of the central plane and on said one side of the transverse plane, and across the floor on said other side of the central plane, a second group of the cable lengths extending from the bundle at said other end of the mixing rod extending through the recess at the other end of the mixing rod, through the arcuate groove of the second pair on said other side of the central plane, through the longitudinal groove connected to that arcuate groove so as to cross over the cable lengths of the second group in that arcuate groove, through the transverse groove on said other side of the central plane and on said other side of the transverse plane, through the recess at said one end of the mixing rod, through the oblique groove on said one side of the central plane and on said one side of the transverse plane and across the floor on said one side of the central axis.

6. An assembly as claimed in claim 5 characterized in that said first and third groups of cable lengths each consist of a first number of cable lengths, said second and fourth groups of cable lengths consisting of a second number of cable lengths which is different from said first number.

7. An assembly as claimed in claim 1, characterised in that each cable length extends through a sealing grommet in its respective bore, the housing being sealingly closed by a cover.

8. An assembly as claimed in claims 1, characterized in that the mixing rod is enclosed in a further housing, the bundles of optical cables being terminated by respective ferrules received in enlarged end portions of the further housing, said central groove being configured to accommodate said further housing.

9. An assembly as claimed in claim 1, characterized in that the cable lengths are secured to the base by means of U-shaped clips having legs received in receptacles in said base.

10. A one-piece, moulded plastics housing for an optical star coupler comprising an optical mixing rod having a bundle of optical cables optically and mechanically connected to each end thereof and extending from said bundles; the housing being characterized in that it comprises a flat base, having longitudinal side walls connected by end walls, said walls upstanding from said base, the housing having a central plane bisecting said end walls and a transverse plane bisecting said side walls, an upwardly open elongate central groove in said base, for receiving said mixing rod and said bundles being bisected longitudinally thereof by said central plane, said base being formed with a first pair of upwardly open arcuate grooves and a second pair of upwardly open arcuate grooves, the grooves of each pair of arcuate grooves being disposed on opposite sides of said central plane and the pairs of arcuate grooves being disposed on opposite sides of said transverse plane and being bowed away therefrom, one end of each arcuate groove of the first pair being connected to one end of a respective arcuate groove of the second pair by way of a respective longitudinal groove extending parallel to, and proximate to a respective side wall of the housing, the other end of each arcuate groove of the first pair communicating with an upwardly open recess in the base, said recess also communicating with the central groove at one end thereof, the other end of each arcuate groove of the second pair communicating with a further upwardly open recess in the base, said further recess also communicating with the other end of said central groove, each recess being connected to a respective one of said longitudinal grooves by way of an upwardly open transverse groove and each said recess further communicating with a respective upwardly exposed floor in said base, said floors being located on opposite sides of said central plane, an array of cable guiding posts projecting from each floor, each side wall being formed with a row of through bores, the row extending parallel to the central plane and the bores extending parallel to said transverse plane.

11. An assembly housing an optical star coupler comprising an optical mixing rod having a bundle of optical cables optically and mechanically connected to each end thereof, lengths of said cables extending from said bundles;

characterized by a housing having a base and external walls upstanding from the base and being formed with through bores, the mixing rod being secured to the base and the cable lengths extending from said bundles also being secured to the base with end portions of said lengths projecting through respective ones of said bores and outwardly of said walls for connection to respective optical devices;

the mixing rod is received in a central groove in the base and is held down in the groove by means securing the portions of said cable lengths proximate to said bundles;

wherein said cable lengths extend through further grooves in the base, communicating with the central groove at each end thereof, said lengths extending from said further grooves between cable guiding posts to said bores said posts being disposed laterally of said central groove, said external walls upstanding on opposite sides of said central groove; and wherein said external walls are longitudinal side walls of the housing connected by end walls thereof, the housing having a central longitudinal plane bisecting said end walls and a transverse central plane bisecting the side walls, said further grooves comprising a first pair of arcuate grooves and a second pair or arcuate grooves, the grooves of each paid of arcuate grooves being disposed on opposite sides of said central plane and the pairs of arcuate grooves being disposed on opposite sides of said transverse plane and being bowed away therefrom, one end of each arcuate groove of the first pair being connected to one end of a respective arcuate groove of the second pair, by way of a respective longitudinal groove, the other end of each arcuate groove of the first pair communicating with a recess in the base, said recess also communicating with said central groove at one end thereof, the other end of each arcuate groove of the second pair communicating with a further recess in the base said further recess also communicating with the other end of said central groove, each of said recesses being connected to a respective one of said longitudinal grooves, by way of a transverse groove and each said recess further communicating with a respective floor in said base, by way of a respective oblique groove, said floors being arranged upon opposite sides of said central plane, an array of said cable guiding posts projecting from each floor, a portion of each external wall in which portion the bores of that wall are formed, being aligned with, and bounding, a respective one of said floors.

12. An assembly as claimed in claim 11, characterized in that each cable length extends through a sealing grommet in its respective bore, the housing being sealingly closed by a cover.

13. An assembly as claimed in claim 11, characterized in that the mixing rod is enclosed in a further housing, the bundles of optical cables being terminated by respective ferrules received in enlarged end portions of the further housing, said central groove being configured to accommodate said further housing.

14. An assembly housing an optical star coupler comprising an optical mixing rod having a bundle of optical cables optically and mechanically connected to each end thereof, lengths of said cables extending from said bundles;

characterized by a housing having a base and external walls upstanding from the base and being formed with through bores, the mixing rod being secured to the base in a central groove of the base with holding means, and the cable lengths extending from said bundles, with end portions of said lengths projecting through respective ones of said bores for connection to respective optical devices;

wherein said cable lengths communicate with the central groove at at least one end thereof, said lengths extending between cable guiding posts to said bores;

the housing having a central longitudinal plane and a transverse central plane, the base including pairs of arcuate grooves, the grooves being disposed on opposite sides of said central plane, and the pairs of arcuate grooves being disposed on opposite sides of said transverse plane and being bowed away from the transverse plane, at least one end of each arcuate groove of said pairs being connected to one end of a respective arcuate groove of the other pair, by way of a respective longitudinal groove, the other end of each arcuate groove of the at least one pair communicating with a recess in the base, said recess also communicating with said central groove at one end thereof, the other end of each arcuate groove of the other pair communicating with a further recess in the base, said further recess also communicating with the other end of said central groove;

whereby the radius of curvature of the arcuate bends is at a minimum so that the optical fibers can be set in the grooves and around the posts for an orderly, compact array of fibers ready for connection to optical devices.

15. An assembly as claimed in claim 14, characterized in that each cable length extends through a sealing grommet in its respective bore, the housing being sealingly closed by a cover.

16. An assembly as claimed in claim 14, characterized in that the mixing rod is enclosed in a further housing, the bundles of optical cables being terminated by respective ferrules received in enlarged end portions of the further housing, said central groove being configured to accommodate said further housing.

* * * * *